United States Patent [19]

Weber et al.

[11] Patent Number: 4,560,118

[45] Date of Patent: Dec. 24, 1985

[54] DRIVE MECHANISM FOR FISHING REEL

[75] Inventors: John A. Weber; Herbert O. Henze, both of Philadelphia, Pa.

[73] Assignee: Penn Fishing Tackle Mfg. Co., Philadelphia, Pa.

[21] Appl. No.: 589,889

[22] Filed: Mar. 15, 1984

[51] Int. Cl.[4] .......................................... A01K 89/015
[52] U.S. Cl. ..................................... 242/215; 74/332; 74/342
[58] Field of Search ................. 242/215, 216; 74/332, 74/341, 342

[56] References Cited

U.S. PATENT DOCUMENTS

| | | |
|---|---|---|
| 840,055 | 1/1907 | Ferguson . |
| 897,261 | 8/1908 | Duryea . |
| 1,971,724 | 8/1934 | Mathieu .............................. 242/215 |
| 2,150,088 | 3/1939 | White . |
| 2,184,149 | 12/1939 | Marr . |
| 3,425,644 | 2/1969 | Griste . |
| 3,478,979 | 11/1969 | Henze . |
| 4,390,147 | 6/1983 | Zuckerman . |

FOREIGN PATENT DOCUMENTS 503837 12/1954 Italy .................................... 242/215

Primary Examiner—Billy S. Taylor
Attorney, Agent, or Firm—Benasutti & Murray

[57] ABSTRACT

A drive mechanism for fishing reels is disclosed which includes a spool supported on bearings and a shaft, carried in spaced side plates of a reel frame. The reel includes a cam operated brake mechanism which includes a plurality of stops, with an axially slidable spool shaft. One of the bearings carries a shaft supporting a bearing and drive mechanism which includes a handle, positioning pin and gears slidably mounted on shafts, which upon selective manipulation will engage one of two sets of gears, thereby determining the drive ratio available to the handle for varying the speed of spool rotation as desired. The gear ratios are selected to provide that upon backward or counterclockwise handle rotation against the stops, the teeth of the gears of the lower ratio will always be angularly aligned with the internal teeth of the ring gear to provide for gear shifting.

9 Claims, 6 Drawing Figures

DRIVE MECHANISM FOR FISHING REEL

BACKGROUND OF THE INVENTION

1. Field of the Invention

This invention relates to drive mechanisms for fishing reels and more particularly to a variable speed driving mechanism for fishing reels.

2. Description of the Prior Art

It has heretofore been proposed as shown in the U.S. Pat. No. 840,055 to Ferguson, to provide a change speed gear arrangement for use in automobiles, wherein slidable gears are provided with external teeth, which can engage internal teeth on other gears to change the speed of the output shafts.

No comparable structure useful with fishing reels is suggested in Ferguson.

The U.S. Pat. No. 897,261 to Duryea, discloses a transmission mechanism which includes an internal gear 5 mounted to shaft 2 which can be engaged by gears 9, 10 when moved by gear shifter 12. No comparable structure useful with fishing reels is suggested by Duryea.

The U.S. Pat. No. 2,150,088 to White, discloses a fishing reel which includes a spool and a drive gear mechanism carried in one end plate. The mechanism includes gears 37, 38, 39, 40 which are rotatable, but not movable in a longitudinal direction and change in speed is obtained by lengthwise shifting of a shaft from the driving handle, which has a pin 42 which selectively engages notches 41 in the gears 39, 40 to determine which sets of gears and therefore at which speed the spool is driven.

The U.S. Pat. No. 2,184,149 to Marr, discloses a fishing reel similar to White, which includes a gear change mechanism having a shaft 36 extending inwardly from a driving handle 26 with a large gear 46 and a small gear 44 fixed to the shaft. A shaft 32 carries a spool 24 for winding of line thereon.

The shaft 32 has gears 48 and 50 freely rotatable thereon but adapted to be selectively coupled with shaft 32 by longitudinal movement of a selector key 54. The selector 54 includes a locking element 56 which can engage in slots 60 in either gear 48 or 50 to couple to the shaft 32, and through engagement with gear 44 or 46 to drive shaft 32 at different speeds.

No shiftable gears, with positive locking engagement are provided in Marr.

The U.S. Pat. No. 4,390,147 to Zuckerman, discloses a three speed drive mechanism for fishing reels, which includes a frame supporting a spool carried on a shaft which has a driven spool gear. A gear housing is carried on the frame, which has three drive gears of varying diameter meshed with the spool drive gear, and with a rotatable crank plate carrying a crank handle selectively engageble with a desired one of the drive gears to cause the spool to be driven at the desired speed.

The U.S. Pat. No. 3,478,949 to Henze and the U.S. Pat. No. 3,425,644 to Griste disclose fishing reels with friction drags which provide for winding of the reels, or for free spool rotation for casting as desired, and which is effected by axial shifting of the spool shaft.

No gear shifting is disclosed or contemplated in said Henze and Griste patents.

The drive mechanism of my invention does not suffer from the shortcomings of prior structures and provides many positive advantages.

SUMMARY OF THE INVENTION

In accordance with the invention, a drive mechanism for fishing reels is provided, which has gears slidably mounted on the handle drive shaft, which are selectively engageable with fixedly mounted gears on a spool supporting and driving shaft, which shaft has positive steps to provide for easy gear shifting.

The principal object of the invention is to provide a drive mechanism for fishing reels with shiftable gears to provide for different driving speeds of the spool as desired.

A further object of the invention is to provide a drive mechanism of the character aforesaid wherein the drive shaft is stopped at the time of changing gears.

A further object of the invention is to provide a drive mechanism of the character aforesaid which is simple and inexpensive to construct but sturdy and reliable in operation.

A further object of the invention is to provide a drive mechanism of the character aforesaid which is easy to use.

A further object of the invention is to provide a drive mechanism of the character aforesaid which is readily accessible for maintenance.

A further object of the invention is to provide a drive mechanism which can be used with a variety of kinds of fishing reels.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figures 1, 2, 3:
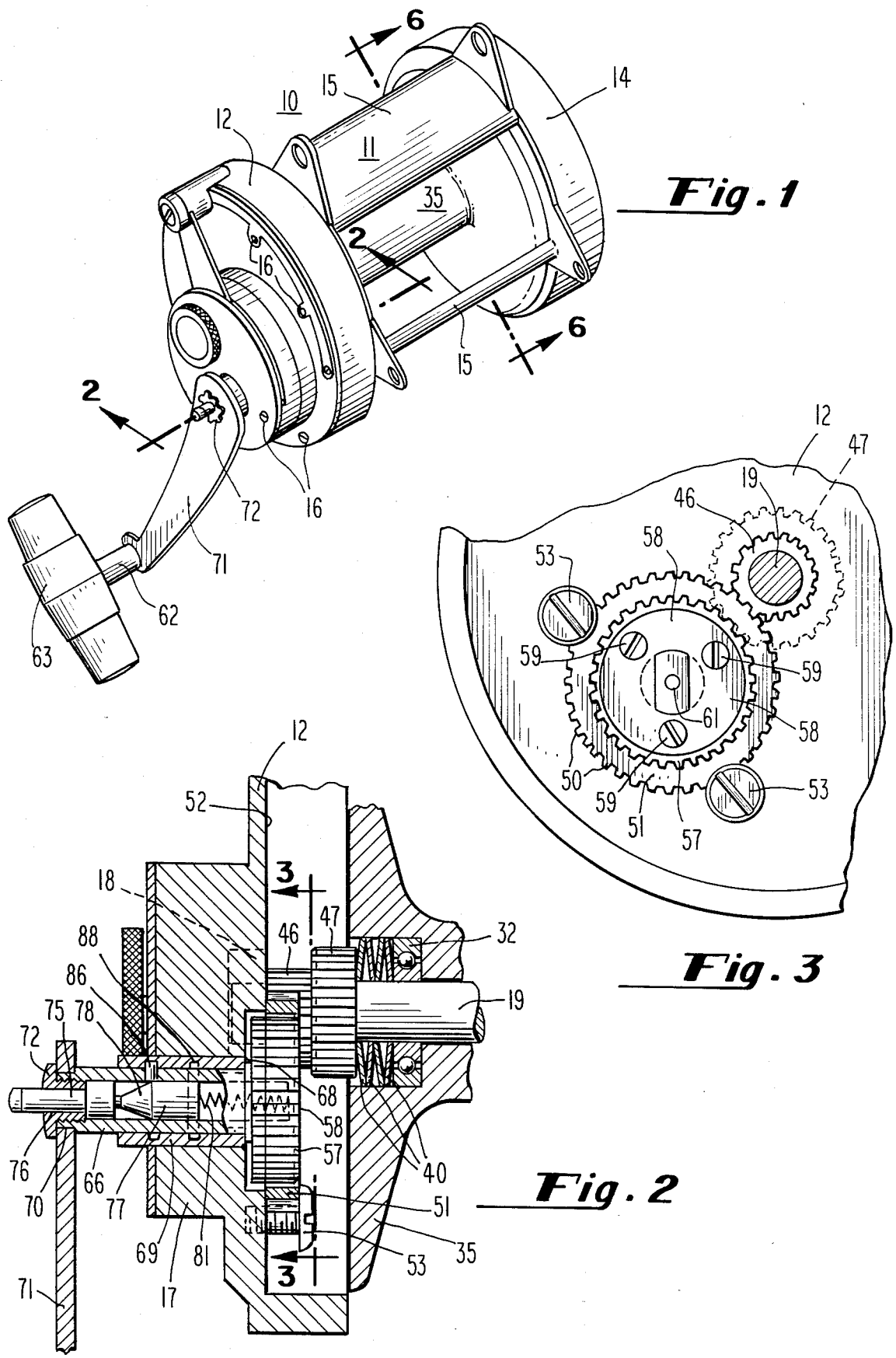
FIG. 1 is a view in perspective of a fishing reel which incorporates one embodiment of the drive mechanism in accordance with the invention.
FIG. 2 is a fragmentary vertical sectional view, enlarged, taken approximately on the line 2—2 of FIG. 1.
FIG. 3 is a vertical sectional view taken approximately on the line 3—3 of FIG. 2.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and FIGS. 1 to 6 thereof in which a preferred embodiment of the invention is illustrated, a reel 10 is shown of conventional type which includes a reel frame 11 with spaced side plates 12 and 14, and connected by frame posts 15 and screws 16. The side plate 12 has a boss 17 with a bearing 18 carried therein, which supports a spool shaft 19 at one end.

The side plate 14 has a bearing 18 carried thereby which supports the hub 19A of a drive plate 20. The drive plate 20, on the same side thereof as the hub 19A has a side rim 21 provided with a plurality of interior peripheral shoulders or stops 22 with guide surfaces 23 therebetween.

The side plate 14 on the interior thereof has a plurality of dogs 24 carried on pivot pins 25 and normally urged outwardly by springs 26 which extend around the outside of the bearing 18 and are clamped in place by screws 27.

Figure 5:
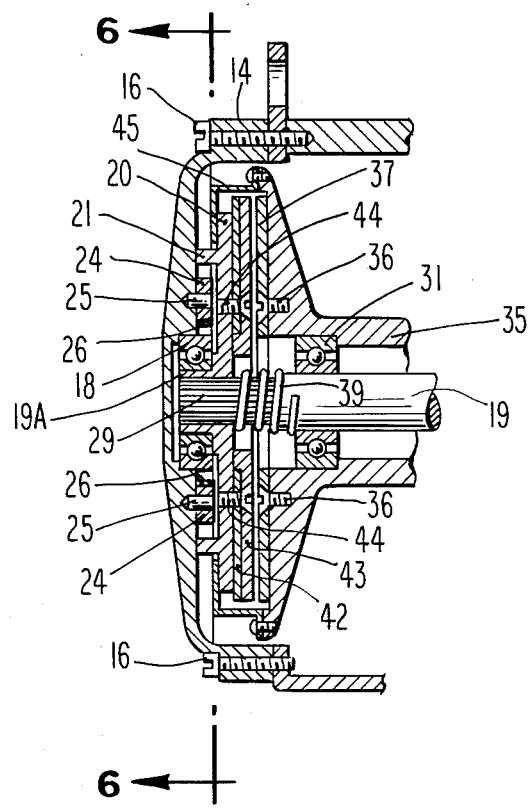
FIG. 5 is a vertical sectional view taken approximately on the line 6—6 of FIG. 1.

The drive plate 20 has interior splines 28 for slidable engagement by complemental splines 29 of shaft 19. The shaft 19 has, at spaced locations thereon, spool supporting bearings 31 and 32 which engage internal shoulders 33 and 34 of a spool 35. The spool 35 has a drag washer 37 of friction material as shown in FIG. 5 secured to the end face thereof by screws 36.

A helical spring 39 is interposed between the drive plate 20 and the bearing 31 and a spring 40, which may be of the Belleville spring washer type, and which engages the bearing 32 as shown in FIG. 2.

The drive plate 20 has a drag washer 42 of friction material carried thereby, for engagement with the contiguous drag washer 37. The washer 42 is positioned by a collar 43 which is secured to the plate 20 by screws 44.

A drag cover ring 45 can be provided carried by the spool 35.

The spool shaft 19 adjacent bearing 18, has a small gear 46 and a larger gear 47 fixedly secured thereto in any desired manner.

The gears 46 and 47 are shown as the straight tooth type with external teeth 48 and 49 respectively extending therefrom.

Figure 4:
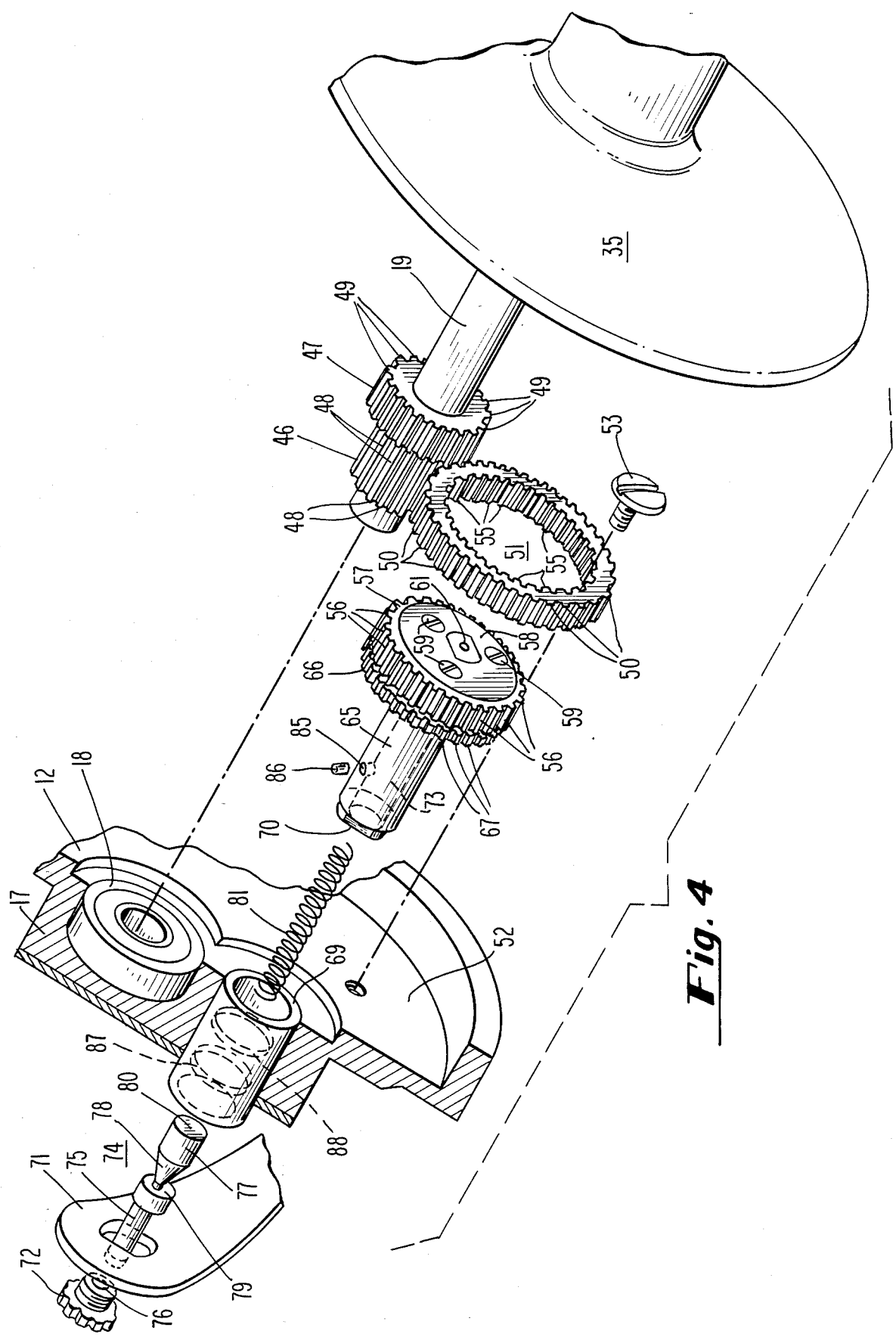
FIG. 4 is an exploded perspective view enlarged of the drive mechanism of the invention.

The gear 46 has its teeth 48 engaged with the external teeth 50 of a large ring gear 51. The ring gear 51 is retained against side wall 52 of side plate 12 by screws 53. Gear 51 has internal teeth 55, which as shown in FIG. 4, may be engaged by external teeth 56 of gear 57, which is carried on and secured to plate 58 by screws 59, which plate 58 is engaged with end 61 of a stud shaft 65.

The stud shaft 65 has a gear 66 thereon, of the same external diameter and tooth 67 configuration as gear 57 but free to rotate on shaft 65 against shoulder 68 of stud shaft 65.

The stud shaft 65 is rotatably carried in a sleeve bearing 69 which is illustrated as a sleeve bearing and carried in boss 17 of side plate 12.

The stud shaft 65 has an extension 70, to which a radial arm 71 is detachably secured by a threaded handle nut 72.

The arm 71 has a crank rod 62 to which a knob 63 is pivotally supported for rotation of the arm 71.

The shaft 65 has a hollow bore 73 therein, which carries a positioning pin 74, which has a portion 75 which extends through an opening 76 in nut 72, a central portion 77, a tapered portion 78, a shoulder portion 79, and an end portion 80 which engages a coil spring 81 which is in contact with the inside face (not shown) of the shaft 65, urging the pin 74 to the left as seen in FIG. 4.

The shaft 65 has a radial passageway 85 therein, which carries a tumbler pin 86, which is urged outwardly by tapered portion 78, and can engage in one of the grooves 87 or 88 in bearing 69.

The shaft 19 has a cam (not shown) of well known type engaged therewith and by a cam arm 89 to cause the movement of the spool shaft 19 to engagement positions with the friction washers 37 and 42 as shown in FIG. 5 so that the dogs 24 can engage shoulders 22 and stop rotation of the spool shaft 19 in one direction, for gear shifting to be described below.

The gear ratios between gears 46, 47, 51 and 57 are selected to provide for easy spool 35 winding when under load, and fast winding when no or minimum load is present. It has been found that for the slowest speed, a low speed gear ratio of between 1.25 and 2 to 1 is satisfactory and that for the faster speed a gear ratio of between 2 and 4 to 1 is satisfactory. In order to provide for gear changing without jamming of the gears and while under load the number of stops which are satisfactory can be in the range of 4 to 24 stops.

It should be noted that the gear ratios are selected so that when gear change is desired, the teeth of the gears of the lower ratio are always aligned with the internal teeth of the ring gear, permitting shifting with ease and without damage to the gears.

The mode of operation will now be pointed out.

Figure 6:
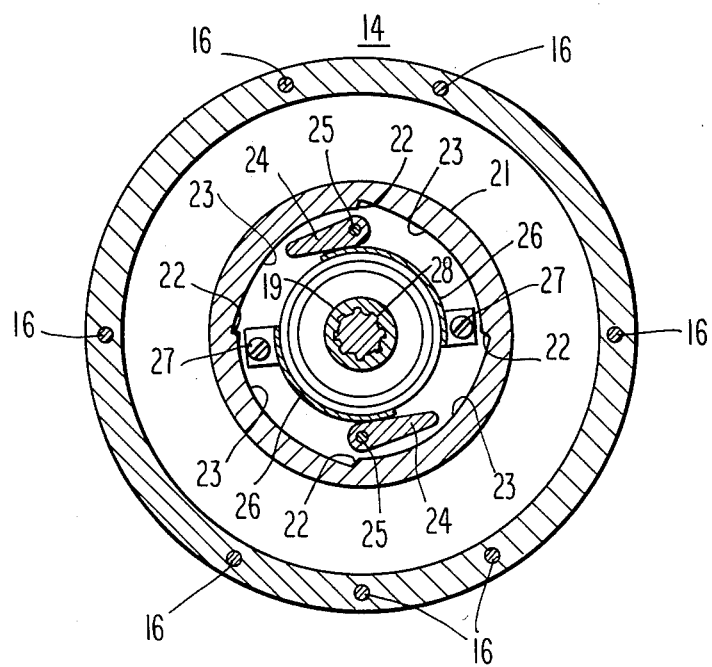
FIG. 6 is a vertical sectional view taken approximately on the line 6—6 of FIG. 5.

Referring now to FIGS. 1 and 6, when it is desired to operate the reel 10 to bring in a line (not shown) with a heavy weight thereon, it is desirable to select the speed ratio that reduces fatigue and wear on the equipment and on the angler.

The slowest speed being required, the handle 63 and arm 71 are rotated in a counterclockwise direction against the stops so that dogs 24 engage in shoulders 22 and shaft 19 is stopped.

The portion 75 of positioning pin 74 is pressed inwardly, which forces pin 74 inwardly against spring 81 as seen in FIGS. 2 and 4, so that tumbler pin 86 can move downwardly out of groove 87. Shaft 65 can then be urged inwardly so that pin 86 is in position to engage groove 88, and gear 57 can engage gear 47 thereby permitting driving of spool shaft 19 and spool 35 at the slower speed.

If the faster speed is desired, then the pin 74 is pressed in so that tumbler pin 86 moves downwardly out of groove 88, and shaft 65 can be moved outwardly engaging pin 86 in groove 87, and gear 57 can engage ring gear 51, which drives gear 46 and therefore spool shaft 19 and spool 35 at the higher speed.

It will thus be seen that a drive mechanism has been provided with which the objects of the invention are attained.

We claim:

1. A fishing reel having spaced side plates, a spool interposed between said plates, a spool shaft journaled in a bearing at one end in one of said plates and on which said spool is carried, said spool shaft at its other end being journaled in a bearing carried in said other end plate, and drive means for rotating said spool in one direction comprising:

two gears of different diameter in side by side arrangement fixedly mounted to said spool shaft adjacent said first mentioned end plate;
a stud shaft journaled in a bearing carried by said first mentioned end plate;
a radial arm mounted to said stud shaft by a handle nut;
a crank rod mounted to said arm;
a knob mounted to said crank rod for rotation thereof;
gear means carried by said stud shaft,
said gear means comprising
at least one gear fixedly mounted to said stud shaft, a rotatably mounted gear means carried by said stud shaft;

ring gear means engaged with said one of said spool shaft gears and with said stud shaft rotatably mounted gear means; and means for axially positioning said stud shaft for selectively engaging the stud shaft gear with said ring gear, and said other of said gears carried by said spool shaft.

2. A fishing reel as defined in claim 1 in which
said handle nut has an opening therethrough,
said stud shaft has a bore therein,
said positioning means is carried in said bore and includes a positioning pin which comprises
a portion which extends through said opening in said handle nut,
a central portion,
a tapered portion,
a shoulder portion,
an end portion, and
a spring carried in said bore engaging said end portion of said pin and urging it towards said handle nut,
a tumbler pin carried in a radial opening in said stud shaft and engaged with said tapered portion of said pin, and
groove means in said bearing for selective tumbler pin engagement.

3. A fishing reel as defined in claim 1 in which
said stud shaft gear has external teeth,
said spool shaft gears have external teeth, and
said ring gear means is a ring gear with external and internal teeth.

4. A fishing reel as defined in claim 3 in which
said ring gear external teeth are engaged with said external teeth on said first mentioned spool shaft gear, and
said stud shaft gear has its external teeth engaged with the internal teeth of said ring gear.

5. A fishing reel as defined in claim 4 in which
the speed ratio between said stud shaft gear and said second mentioned spool shaft gear is in the range of one and one quarter to two to one,
the speed ratio between said stud shaft gear, said ring gear and said first mentioned spool shaft gear is in the range of two to four to one.

6. A fishing reel as defined in claim 3 in which
stop means are provided adjacent said other end plate to stop the rotation of said spool shaft prior to gear shifting.

7. A fishing reel as defined in claim 5 in which said gear ratio for said gears provides for angular alignment of said gear teeth prior to axial positioning.

8. A fishing reel as defined in claim 3 in which
said gear teeth are of straight configuration.

9. A fishing reel as defined in claim 6 in which
said stop means is a plurality of stops in the range of four to twenty-four stops.

* * * * *